E. A. TORRANCE.
AUTOMOBILE RIM PROTECTOR.
APPLICATION FILED NOV. 18, 1916.
1,221,245.
Patented Apr. 3, 1917.
2 SHEETS—SHEET 1.
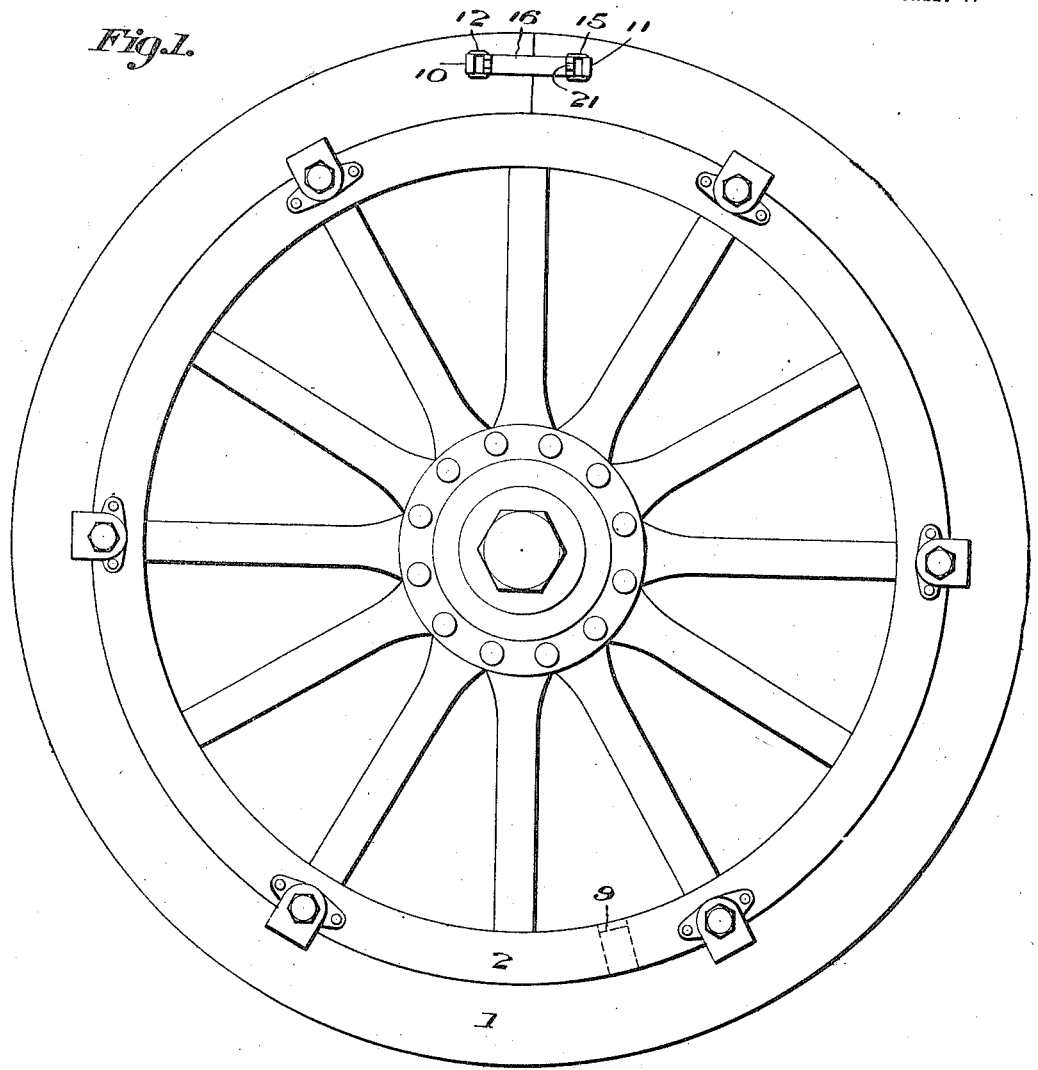
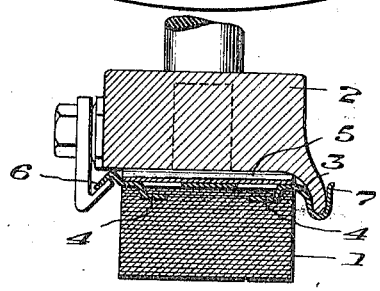
Witness
Philip E. Barnes
Inventor
Edward A. Torrance
by Frank C. Gore
his Atty.

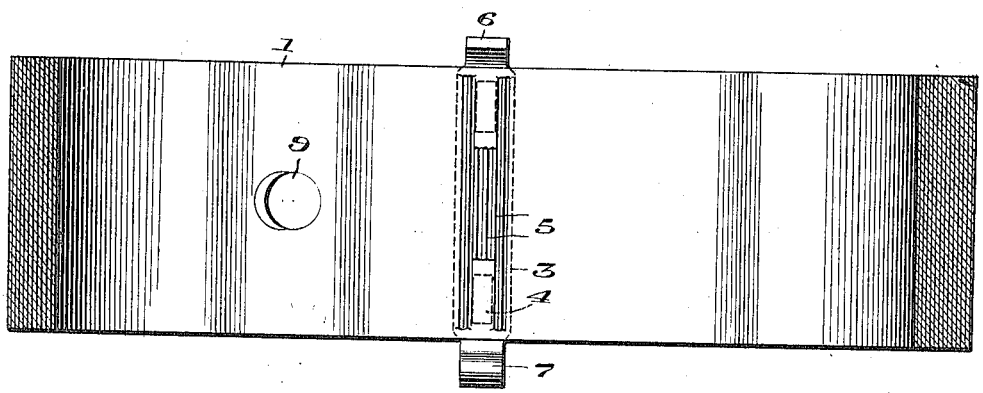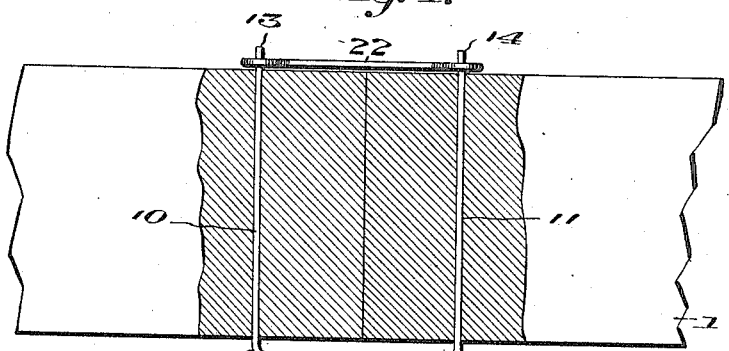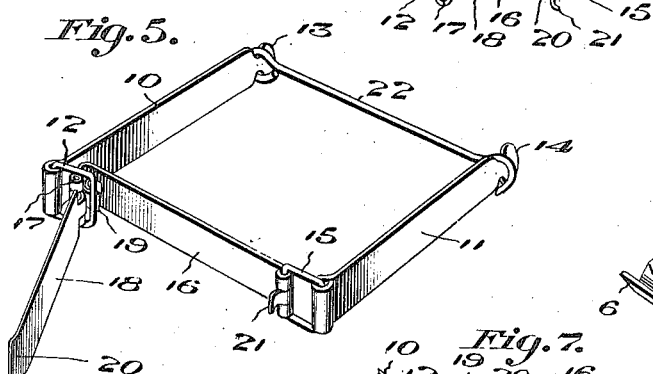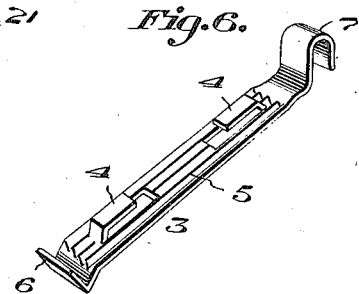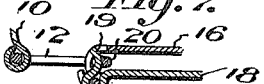

UNITED STATES PATENT OFFICE.

EDWARD A. TORRANCE, OF EVANSVILLE, INDIANA.

AUTOMOBILE-RIM PROTECTOR.

1,221,245.   Specification of Letters Patent.   Patented Apr. 3, 1917.

Application filed November 18, 1916. Serial No. 132,095.

*To all whom it may concern:*

Be it known that I, EDWARD A. TORRANCE, a citizen of the United States, residing at Evansville, county of Vanderburgh, and State of Indiana, have invented certain new and useful Improvements in Automobile-Rim Protectors, of which the following is a specification.

This invention relates to that class of rim protector which is designed to be applied, after removal of the tire, to the wheel rim to serve as a temporary cushion or protector for the rim when the usual tire has suffered a blow-out and there is no spare tire available on the automobile.

My object is to provide an improved protector which can be quickly applied to the rim and will protect it from injury until a garage can be reached, or any reasonable distance covered, and repairs, or a new tire, be obtained.

My invention contemplates the provision of a protector of suitable thickness carrying improved cross braces and attachments, preferably countersunk therein, adapted to engage the rim to hold the protector against lateral displacement.

My invention consists, further, in an improved connector by which the ends of the protector are secured together around the rim.

My invention being susceptible to modication without altering its essential construction and principle of operation, the disclosure set forth hereinafter and found in the accompanying drawing is to be considered as illustrative, rather than restrictive, of the scope of the invention.

In the accompanying drawings:

Figure 1 is a side elevation, showing the invention applied to a wheel rim;

Fig. 2, a detail cross section;

Fig. 3, a detail inner face view;

Fig. 4, a detail plan, showing the end fastening;

Fig. 5, a detail perspective thereof;

Fig. 6, a detail of one of the cross braces and attaching devices, and

Fig. 7, a detail cross section of certain parts of the end fastening.

The protector body 1 is preferably of a composition of canvas and wool, or either of them alone, or any other suitable material, combined with a suitable amount of rubber, to afford elasticity, compressed into a single flat elastic strip of about the width of the automobile wheel rim and of approximately one and one-quarter inches thickness. The protector will be made in suitable widths and thicknesses to accommodate the several sizes of rims commonly used on automobiles.

Countersunk in that side of the protector body or tread 1 which is designed to lie next to the rim, shown at 2, are metal cross braces and attaching devices 3 which may be secured to the tread or protector 1 by struck-up lips 4 molded therein. If preferred, the cross braces and attaching devices 3 could be disposed between the plies of the tread 1. There are as many of the devices 3 as there are tire securing lugs on the wheel rim 2. The attaching devices 3 are spaced apart and distanced corresponding to the distance between adjacent tire securing lugs so that they will register with said lugs. The hooked end 7 of the device 3 is adapted to catch on the inside of the rim. The smaller hook 6 is adapted to engage the outside of the rim and these catches or hooks are locked the same as is the usual tire.

That side of the cross brace 3 which lies nearest the rim 2 is preferably provided with ridges or corrugations 5 which are embedded in the tread 1 and may project therebeyond so as to be adapted to bite into or engage the rim 2 to prevent slipping of the protector.

The protector 1 is provided with a lug or protuberance 9 which is adapted to enter and occupy the valve hole in the rim, the pneumatic tire having been removed before the present protector is applied to the rim. The lug or protuberance assists in preventing the tread from slipping or creeping around the rim 2.

Embedded edgewise in the respective end portions of the protector 1 are the metal pieces 10 and 11, the former of which has a hinged lip or bail 12 at one end and a head 13 at its other end. The metal strip 11 has a head 14 at one end, and hinged lip or bail 15 at its other end. Jointed to the bail 15 is a plate 16 to which is hinged at 17, a catch plate 18 provided with a projecting lip 19 which is straddled by bail 12. A flange 20 on the plate 18 is adapted to engage a hook 21 on the member 16.

A catch hook 22 is permanently attached to the head 13 and is adapted to hook over the catch head 14.

The end portions of the members 10 and 11 project freely beyond the edges of the protector 1 so that the bails 12 and 15 and the plates 16 and 18 are free for attachment and detachment. The same is true regarding the catch of hook 22 which is located on the inner side of the protector, or that side adjacent the body of the car.

The plates 10 and 11 are so located that when the protector has been brought around the wheel rim, the free end of the plate 16 may be passed over the bail 12 and the plate 18 may then be swung over the plate 16 to cause the parts 20 and 21 to engage. The outer edge of the protector is then secured. The hook or catch 22 may now be engaged with the head 14 to secure the protector ends together at their inner edges. The bail 12 bearing against the lip 19 will naturally constantly pull thereagainst to hold the plate 18 closed; hence, the parts 20—21 are not essential. The protector being thus fastened around the rim, the automobile may proceed until a suitable place has been reached where repairs, or a new tire, may be had.

Having thus described my invention, what I claim as new and desire to secure by Letters Patent, is:

1. In an automobile wheel rim protector, a tread adapted to be fastened around the rim, means for connecting the end portions of the tread together, and cross braces and attaching devices carried at intervals by the tread which are provided at their end portions with hooks adapted to engage the rim.

2. In an automobile wheel rim protector, a tread adapted to be fastened around the rim, means for connecting the end portions of the tread together, and cross braces and attaching devices carried at intervals by the tread which are provided with hooks at their respective ends, one of which is adapted to engage the inner flange of the rim and the other the outer flange thereof.

3. In an automobile wheel rim protector, the combination with a tread adapted to encircle the rim, of means for securing the end portions of said tread comprising plates arranged cross-wise of and carried by the respective end portions of the tread, a hook or catch carried by one of said plates and adapted to detachably engage the other of them, hinged bails carried by the other end portions of the plates, and a releasable catch or connector jointed to one of the bails and adapted to engage the other of them.

4. In an automobile wheel rim protector, the combination with a tread adapted to encircle the rim, of means for securing the end portions of said tread comprising plates arranged cross-wise of and carried by the respective end portions of the tread, a hook or catch carried by one of said plates and adapted to detachably engage the other of them, hinged bails carried by the other end portions of the plates, a releasable catch or connector jointed to one of the bails and adapted to engage the other of them, said connector having a hinged plate, and a flange and catch for locking said plate in closed position.

5. In an automobile wheel rim protector, the combination with a tread adapted to encircle the rim, of means for securing the end portions of said tread comprising plates arranged cross-wise of and carried by the respective end portions of the tread, means for detachably securing the plates together at one end, loops on the other ends of said plates, a releasable connector engaged with one of said loops, and a plate hinged to said connector and provided with a lip adapted for engagement by the remaining loop whereby the pressure thereof keeps the plate closed.

6. In an automobile wheel rim protector, the combination with a tread adapted to encircle the rim, of means for securing the end portions of said tread comprising plates arranged cross-wise of and carried by the respective end portions of the tread, means for detachably securing the plates together at one end, loops on the other ends of said plates, a releasable connector engaged with one of said loops, a plate hinged to said connector and provided with a lip adapted for engagement by the remaining loop whereby the pressure thereof keeps the plate closed, and a flange and catch on the connector and plate for locking the free end of the latter.

In testimony whereof, I hereunto affix my signature.

EDWARD A. TORRANCE.

Copies of this patent may be obtained for five cents each, by addressing the "Commissioner of Patents, Washington, D. C."